US009829949B2

(12) United States Patent
Min et al.

(10) Patent No.: US 9,829,949 B2
(45) Date of Patent: Nov. 28, 2017

(54) ADAPTIVE INTERRUPT COALESCING FOR ENERGY EFFICIENT MOBILE PLATFORMS

(71) Applicant: INTEL CORPORATION, Santa Clara, CA (US)

(72) Inventors: Alexander W. Min, Hillsboro, OR (US); Ren Wang, Portland, OR (US); Jr-Shian Tsai, Portland, OR (US); Mesut A. Ergin, Portland, OR (US); Tsung-Yuan C. Tai, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 427 days.

(21) Appl. No.: 14/126,884

(22) PCT Filed: Jun. 28, 2013

(86) PCT No.: PCT/US2013/048765
§ 371 (c)(1),
(2) Date: Dec. 17, 2013

(87) PCT Pub. No.: WO2014/209395
PCT Pub. Date: Dec. 31, 2014

(65) Prior Publication Data
US 2015/0212564 A1 Jul. 30, 2015

(51) Int. Cl.
*G06F 13/24* (2006.01)
*G06F 1/32* (2006.01)
(Continued)

(52) U.S. Cl.
CPC ............ *G06F 1/32* (2013.01); *G06F 1/3209* (2013.01); *G06F 1/329* (2013.01); *G06F 1/3278* (2013.01);
(Continued)

(58) Field of Classification Search
CPC .......... G06F 1/32; G06F 1/3234; G06F 1/329; G06F 13/24; Y02B 60/144
See application file for complete search history.

(56) References Cited

U.S. PATENT DOCUMENTS 5,832,286 A * 11/1998 Yoshida .................... G06F 1/26
307/31
6,711,644 B1 3/2004 Accapadi et al.
(Continued)

FOREIGN PATENT DOCUMENTS

CN 1508652 A 6/2004
CN 101198923 A 6/2008
(Continued)

OTHER PUBLICATIONS

International Search Report and Written Opinion received for PCT Patent Application No. PCT/US2013/048765, dated on Mar. 31, 2014, 12 pages.
(Continued)

*Primary Examiner* — Jing-Yih Shyu
(74) *Attorney, Agent, or Firm* — Alpine Technology Law Group LLC

(57) ABSTRACT

Methods and apparatus relating to adaptive interrupt coalescing for energy efficient mobile platforms are discussed herein. In one embodiment, one or more interrupts are buffered based on communication throughput. At least one of the one or more interrupts are released in response to expiration of an interrupt coalescing time period. Other embodiments are also claimed and described.

25 Claims, 9 Drawing Sheets

(51) Int. Cl.
*H04L 12/12* (2006.01)
*H04L 12/861* (2013.01)

(52) U.S. Cl.
CPC .............. *G06F 13/24* (2013.01); *H04L 12/12* (2013.01); *H04L 49/90* (2013.01); *H04L 49/9063* (2013.01); *Y02B 60/126* (2013.01); *Y02B 60/144* (2013.01); *Y02B 60/34* (2013.01)

(56) References Cited

U.S. PATENT DOCUMENTS

| | | | |
|---|---|---|---|
| 7,093,141 | B2 | 8/2006 | Elnozahy et al. |
| 7,454,632 | B2 | 11/2008 | Kardach et al. |
| 7,577,856 | B2 | 8/2009 | Oshins et al. |
| 8,024,590 | B2 | 9/2011 | Song et al. |
| 8,279,790 | B2 | 10/2012 | Wang et al. |
| 8,599,729 | B2 | 12/2013 | Gobriel et al. |
| 8,612,998 | B2 | 12/2013 | Wang et al. |
| 8,635,469 | B2* | 1/2014 | Wang .................... G06F 1/3228 713/300 |
| 2004/0123169 | A1* | 6/2004 | Elnozahy .............. G06F 1/3209 713/320 |
| 2005/0149768 | A1 | 7/2005 | Kwa et al. |
| 2006/0075172 | A1* | 4/2006 | Anand .................... G06F 13/24 710/260 |
| 2007/0005995 | A1* | 1/2007 | Kardach ............... G06F 1/3203 713/300 |
| 2008/0168452 | A1 | 7/2008 | Molaro et al. |
| 2008/0222311 | A1 | 9/2008 | Lee et al. |
| 2009/0077394 | A1 | 3/2009 | Tsai et al. |
| 2009/0150695 | A1* | 6/2009 | Song ........................ G06F 1/00 713/323 |
| 2010/0077107 | A1 | 3/2010 | Lee et al. |
| 2010/0077394 | A1* | 3/2010 | Wang .................. G06F 9/45533 718/1 |
| 2010/0153590 | A1* | 6/2010 | Hsin ..................... G06F 1/3209 710/22 |
| 2010/0169683 | A1* | 7/2010 | Wang ................... G06F 1/3203 713/323 |
| 2012/0079482 | A1* | 3/2012 | Wang .................... G06F 1/3203 718/100 |
| 2012/0166731 | A1* | 6/2012 | Maciocco ............. G06F 1/3275 711/130 |
| 2012/0191995 | A1* | 7/2012 | Naveh .................. G06F 1/3203 713/320 |
| 2012/0246503 | A1 | 9/2012 | Fujisaki et al. |
| 2014/0101674 | A1 | 4/2014 | Wang et al. |
| 2014/0181555 | A1* | 6/2014 | Bodas ................... G06F 9/4812 713/323 |

FOREIGN PATENT DOCUMENTS

| | | |
|---|---|---|
| EP | 3014460 | 5/2016 |
| JP | 2007517332 A | 6/2007 |
| JP | 2010-539753 A | 12/2010 |
| JP | 2012-503257 A | 2/2012 |
| JP | 2012-203585 A | 10/2012 |
| WO | 2012/040068 A1 | 3/2012 |
| WO | 2014/209395 A1 | 12/2014 |

OTHER PUBLICATIONS

International Search Report and Written Opinion received for PCT Patent Application No. PCT/US2011/052045, dated Feb. 28, 2012, 9 Pages.

Office Action received for U.S. Appl. No. 12/888,855, dated Oct. 11, 2012, 7 pages.

Office Action received for U.S. Appl. No. 12/888,855, dated Mar. 25, 2013, 8 pages.

Notice of Allowance received for U.S. Appl. No. 12/888,855, dated Jun. 12, 2013, 6 pages.

Notice of Allowance received for U.S. Appl. No. 12/888,855, dated Aug. 16, 2013, 10 pages.

Office Action received for Chinese Patent Application No. 201180002743.7, dated Jan. 16, 2014, 4 pages of English Translation and 11 pages of Office Action.

International Preliminary Report on Patentability received for PCT Patent Application No. PCT/US2011/052045, dated Apr. 4, 2013, 6 pages.

Notice of Allowance Received for Taiwanese patent application No. 103119567, dated Nov. 27, 2015, 4 pages including 1 page of English translation.

International Preliminary Report on Patentability received for International Patent Application No. PCT/US2013/048765, dated Jan. 7, 2016, 9 pages.

Extended European Search Report received for European Patent Application No. 13887988.7, dated Oct. 31, 2016, 10 pages.

Communication received for European Application No. 13887988.7, dated Nov. 17, 2016, 1 page.

Office Action received for Japanese Patent Application No. 2016-516495, dated Nov. 22, 2016, 11 pages including 6 pages of English translation.

Office Action received for Japanese Patent Application No. 2016-516495, dated May 30, 2017, 11 pages including 6 pages of English translation.

\* cited by examiner

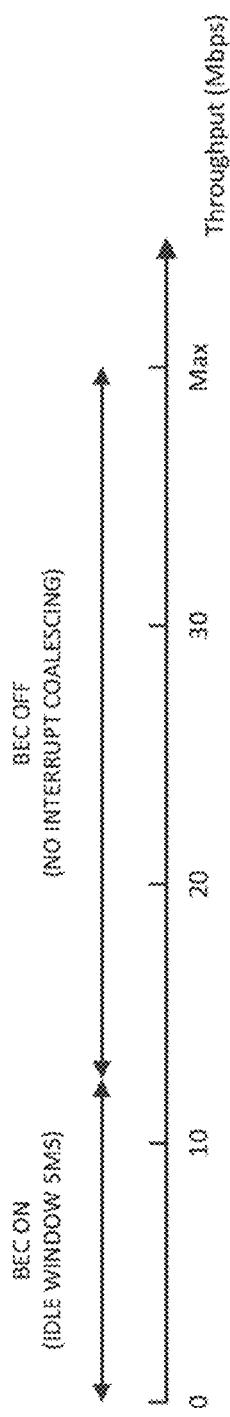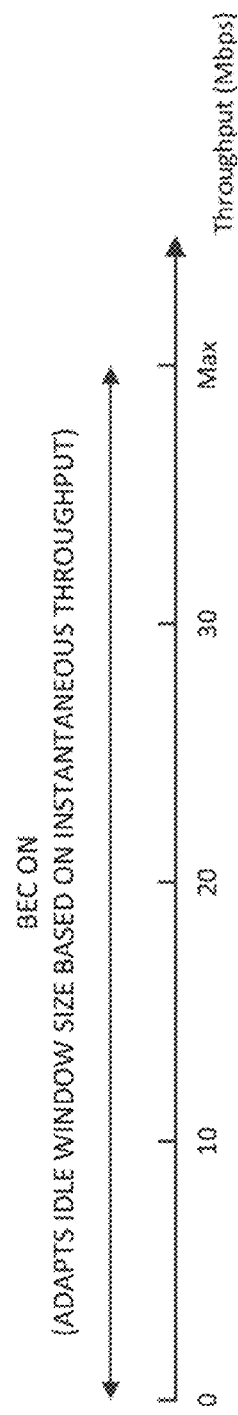
FIG. 2C
FIG. 2D

ADAPTIVE INTERRUPT COALESCING FOR ENERGY EFFICIENT MOBILE PLATFORMS

FIELD

The present disclosure generally relates to the field of electronics. More particularly, an embodiment relates to adaptive interrupt coalescing for energy efficient mobile platforms.

BACKGROUND

Generally, one of the highest power consuming components in computing system is a processor. To reduce power consumption, some implementations may attempt to have the processor enter a sleep or standby mode as often as possible. However, these attempts may be defeated due to occurrence of various events, e.g., triggered by other components in the system, which may force a processor to exit its lower power consumption state.

In turn, the higher power consumption may also increase heat generation. Excessive heat may damage components of a computer system. Further, the higher power utilization may increase battery consumption, e.g., in mobile computing devices, which in turn reduces the amount of time a mobile device may be operated prior to recharging. The additional power consumption may additionally require usage of larger batteries that may weigh more. Heavier batteries reduce the portability or usability of a mobile computing device.

Accordingly, overall system power consumption and utility may be directly related to how long a processor is maintained in a lower power consumption state.

BRIEF DESCRIPTION OF THE DRAWINGS

The detailed description is provided with reference to the accompanying figures. In the figures, the left-most digit(s) of a reference number identifies the figure in which the reference number first appears. The use of the same reference numbers in different figures indicates similar or identical items.

FIGS. 2A-2D include diagrams illustrating comparison of various interrupt coalescing scenarios, according to some embodiments.

DETAILED DESCRIPTION

Figure 1:
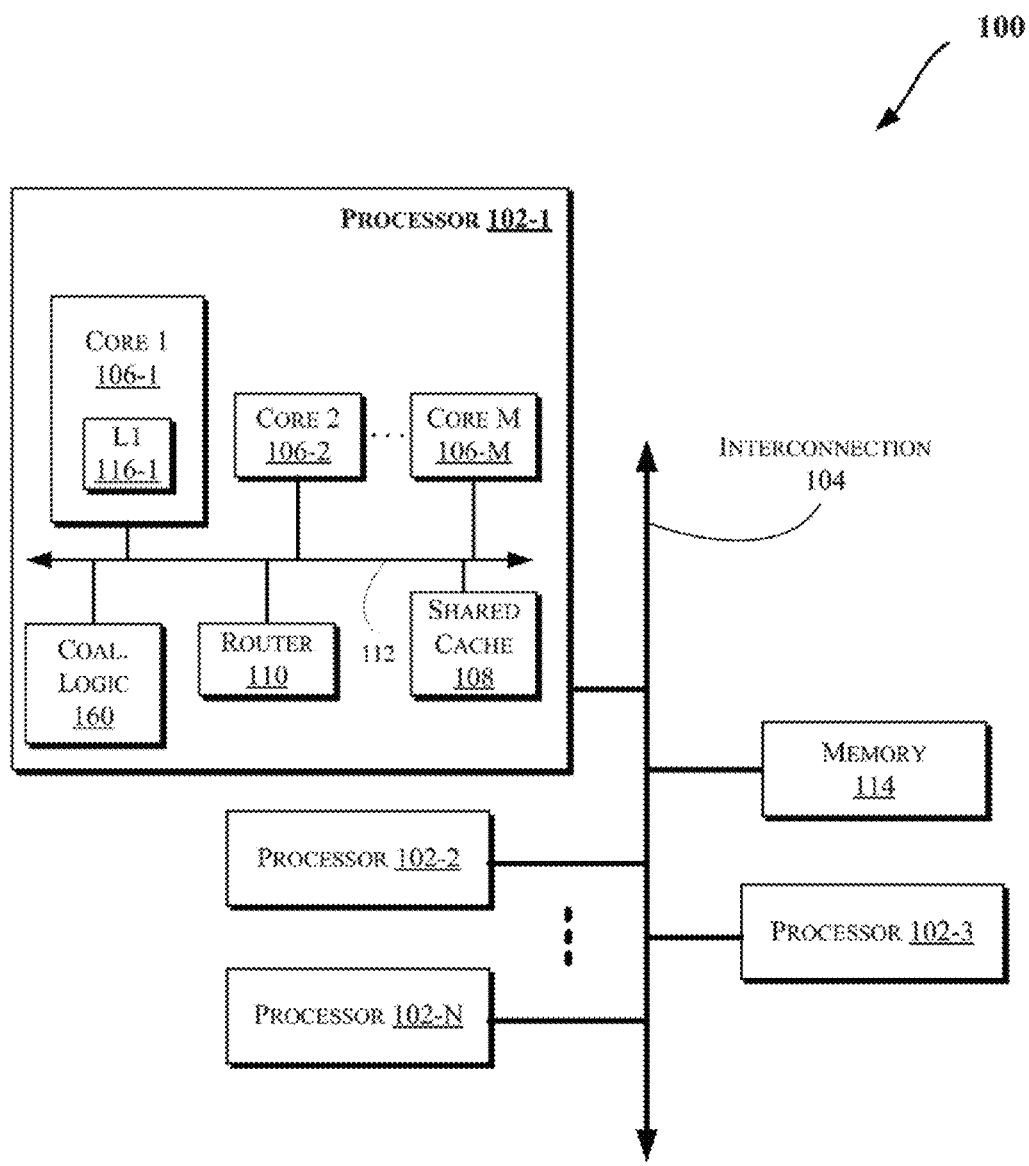
FIGS. 1, 6, 7, and 8 illustrate block diagrams of embodiments of computing systems, which may be utilized to implement various embodiments discussed herein.

In the following description, numerous specific details are set forth in order to provide a thorough understanding of various embodiments. However, various embodiments may be practiced without the specific details. In other instances, well-known methods, procedures, components, and circuits have not been described in detail so as not to obscure the particular embodiments. Further, various aspects of embodiments may be performed using various means, such as integrated semiconductor circuits ("hardware"), computer-readable instructions organized into one or more programs ("software"), or some combination of hardware and software. For the purposes of this disclosure reference to "logic" shall mean either hardware, software, firmware, or some combination thereof.

Energy efficiency is important for today's small form factor mobile platforms, such as smart phones, tablets, laptop computers, UMPC (Ultra-Mobile Personal Computer), Ultrabook™ devices, etc. For active mobile workloads (e.g., file downloading, web browsing, video streaming, etc.), platform power consumption can be significantly reduced by coalescing/deferring system interrupts, and creating relatively longer system idle durations so that CPU (Central Processing Unit) and various subsystems in a platform can enter low-power sleep states for a longer period of time. However, some measurement studies have shown that, in a high throughput regime, coalescing (or buffering) an interrupt for a too long period of time may negatively affect the throughput performance. For example, an excessive coalescing can cause packet loss due to buffer overflow in the communications device (such as Wi-Fi (Wireless Fidelity) NIC (Network Interface Card). Therefore, a major challenge in the design of interrupt coalescing is how to maximize its power saving benefit without compromising throughput performance.

To this end, some embodiments dynamically adapt an interrupt coalescing policy to achieve improved (e.g., maximum) power savings, while preserving throughput performance. One embodiment preserves the throughput performance by dynamically adjusting the coalescing behavior (e.g., frequency of queuing/buffering interrupts and/or length of the coalescing duration for each queuing/buffering instance).

Moreover, interrupt coalescing may be used for platform power saving. For example, two approaches for interrupt coalescing may be used: static and dynamic. In the static policy, coalescing window size may be fixed to a predefined value based on user/system preference. In the dynamic policy, a platform may change the coalescing window size based on number of wake-up events. The dynamic policy may be used for workloads with stable throughput. However, throughput may vary over time for most real-world workloads, e.g., web browsing and video streaming, and as a result, it may negatively affect the throughput performance because it is "reactive" to wake-up events, and not very responsive to throughput changes. To this end, one embodiment preserves the throughput performance by dynamically adjusting the coalescing behavior (e.g., frequency of queuing and/or length of the coalescing duration for each queuing instance).

The techniques discussed herein may be used in any type of a computing system with power consumption settings, such as the systems discussed with reference to FIGS. 1 and 6-8 (which may include smart phones, tablets, laptop computers, UMPC (Ultra-Mobile Personal Computer), Ultrabook™ devices, etc.). More particularly. FIG. 1 illustrates a block diagram of a computing system 100, according to an embodiment. The system 100 may include one or more processors 102-1 through 102-N (generally referred to herein as "processors 102" or "processor 102"). The processors 102 may communicate via an interconnection network or bus 104. Each processor may include various components some of which are only discussed with reference to processor 102-1 for clarity. Accordingly, each of the remaining processors 102-2 through 102-N may include the same or similar components discussed with reference to the processor 102-1.

In an embodiment, the processor 102-1 may include one or more processor cores 106-1 through 106-M (referred to herein as "cores 106" or more generally as "core 106"), a shared cache 108, and/or a router 110. The processor cores 106 may be implemented on a single integrated circuit (IC) chip. Moreover, the chip may include one or more shared and/or private caches (such as cache 108), buses or interconnections (such as a bus or interconnection network 112), memory controllers (such as those discussed with reference to FIGS. 6-8), or other components.

In one embodiment, the router 110 may be used to communicate between various components of the processor 102-1 and/or system 100. Moreover, the processor 102-1 may include more than one router 110. Furthermore, the multitude of routers 110 may be in communication to enable data routing between various components inside or outside of the processor 102-1.

The shared cache 108 may store data (e.g., including instructions) that are utilized by one or more components of the processor 102-1, such as the cores 106. For example, the shared cache 108 may locally cache data stored in a memory 114 for faster access by components of the processor 102. In an embodiment, the cache 108 may include a mid-level cache (such as a level 2 (L2), a level 3 (L3), a level 4 (L4), or other levels of cache), a last level cache (LLC), and/or combinations thereof. Moreover, various components of the processor 102-1 may communicate with the shared cache 108 directly, through a bus (e.g., the bus 112), and/or a memory controller or hub. As shown in FIG. 1, in some embodiments, one or more of the cores 106 may include a level 1 (L1) cache 116-1 (generally referred to herein as "L1 cache 116").

In one embodiment, coalescing logic 160 controls and/or reduces power consumption by one or more components (such as core(s) 106 or other components of system 100) during idle state(s). For example, logic 160 may dynamically adapt an interrupt coalescing policy to achieve improved (e.g., maximum) power savings, while preserving throughput performance. In some embodiments, power consumption control may also be achieved (e.g., by logic 160) based, at least in part, on input from OS (Operating System) software and/or software application(s) (e.g., that may be stored in the memory 114). Moreover, the ability to control the level of power consumption may be used to optimize platform power consumption in response to various determinations such as based on the workload, scenario, usage, one or more sensed temperature values (e.g., as detected by one or more temperature sensors (not shown) located within proximity of one or more of the components of the systems discussed herein, e.g., with reference to FIGS. 1-8), etc. Furthermore, at least some OS operations discussed herein may be interchangeably performed by software applications, firmware, etc. Furthermore, logic 160 may be provided in other locations than the one shown in FIG. 1 (e.g., within cores 106, directly coupled to the interconnection 104, etc.).

Figure 2A:
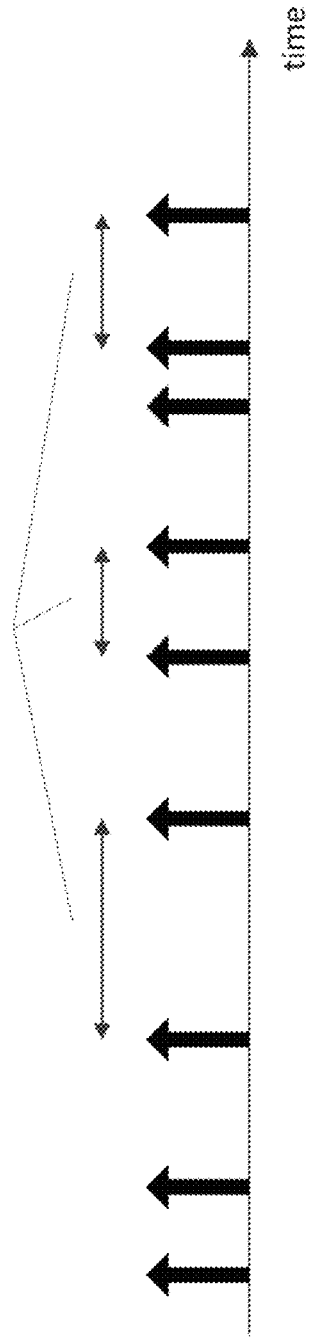
Figure 2B:
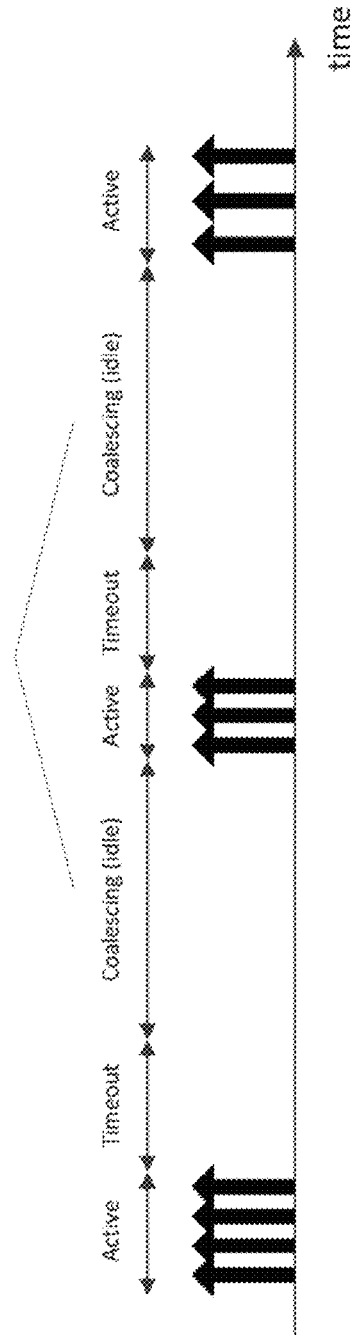

FIGS. 2A and 2B illustrate timing diagrams of sample interrupt arrivals without interrupt coalescing and with coalescing, respectively, in accordance with some embodiments. Overall platform power consumption can be significantly reduced by minimizing the number of processor wake ups, which allows processor/platform to enter and stay longer in low-power sleep states. For example, in a coalescing mode, the processor can be woken up less frequently and serve multiple interrupt requests as a burst instead of frequently waking up the processor for each interrupt.

During the thus-created interrupt coalescing (or buffering) window (also referred to herein as an interrupt coalescing time period), platform can enter low-power sleep states (e.g., Cx and S0ix) without waking up the processor; in general, the longer the coalescing window, the greater the platform power savings. For example, coalescing interrupts from communications devices (e.g., Wi-Fi) may reduce platform power consumption by 10+% for typical Internet file downloading scenarios.

Generally, "S0ix" refers to improved idle power state(s) achieved by platform-level power management that is event driven (e.g., based on OS or software application input) instead of traditional idle power state that is driven either by a user or based on a determination that a platform has been idle for too long (based on a pre-programmed time). In some embodiments, at least some of the power consumption states discussed herein may be in accordance with or similar to those defined under Advanced Configuration and Power Interface (ACPI) specification, Revision 5, December 2011.

As shown in FIG. 2B, when the system does not detect any interrupt for a predefined timeout period, it starts to buffer system interrupts for the duration of a coalescing time period. In an embodiment, these two parameters are jointly optimized "on-the-fly" to maximize platform power savings while preserving the system (e.g., throughput) performance.

Figure 3:
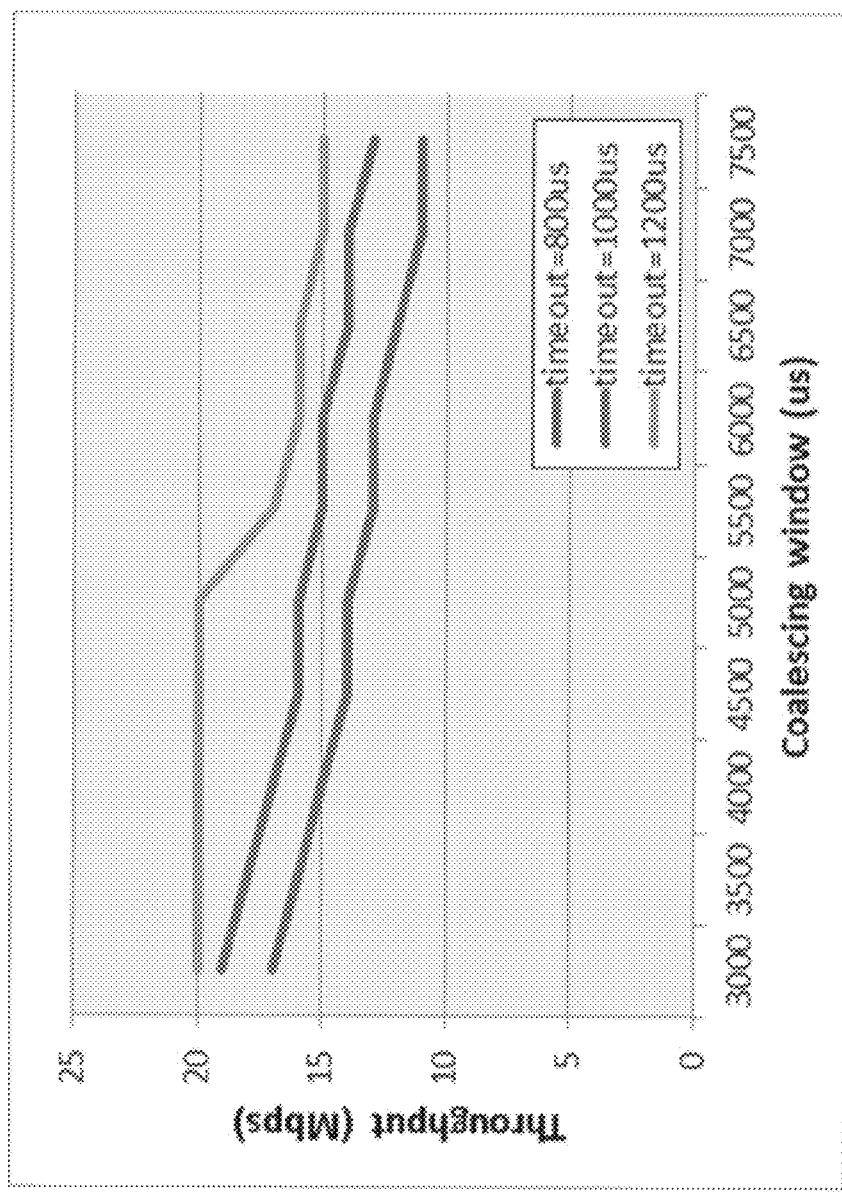
FIG. 3 illustrates a graph of achievable throughput for various parameters, according to some embodiments.

Moreover, it is difficult to maximize power savings with a coalescing policy that has fixed parameters. If the parameters are too aggressive (i.e., small timeout and large coalescing durations), then interrupt coalescing can hurt the throughput performance in a high throughput regime due to multiple reasons, e.g., limited queuing capability in Wi-Fi NIC, which can cause packet losses and retransmissions. For example, the throughput may start to degrade at various throughput ranges depending on the coalescing parameters, as shown in FIG. 3. More specifically, FIG. 3 illustrates a graph of achievable throughput for various parameters such as timeout and coalescing window size, according to some embodiments. FIG. 3 clearly shows that aggressive coalescing, i.e., smaller timeout and larger coalescing window, starts to impact the throughput performance at a lower throughput range.

On the other hand, if the parameters are too conservative (i.e., large timeout and small coalescing durations), then it may not be able to exploit coalescing opportunities in a low throughput regime. Therefore, the coalescing parameters are adjusted dynamically based on system dynamics (e.g., traffic load, throughput goal, power profile, remaining battery life, user preference, types of running application(s) (e.g., 3D gaming, Internet telephony, etc.)).

FIGS. 2C and 2D illustrate throughput diagrams of interrupt coalescing for a fixed approach vs. adaptive approach, respectively, in accordance with some embodiments. To maximize power savings without throughput degradation, one embodiment dynamically adjusts two key parameters; namely, timeout and interrupt coalescing time period (which in turn govern the interrupts coalescing behavior). This differs from the conventional interrupt coalescing with fixed idle window size, as shown in FIG. 2C (with interrupt coalescing active, also referred to herein as BEC (Break-Event Coalescing) on for a given idle window (e.g., 5 ms) and BEC off (where no interrupt coalescing is performed)). By adapting the coalescing window size (such as shown in FIG. 2D), interrupts coalescing can occur in higher throughput ranges without concern for negatively impacting the throughput performance. Therefore, such approaches allow the interrupt coalescing to benefit from a broader range of application (e.g., high quality video streaming).

Figure 4:
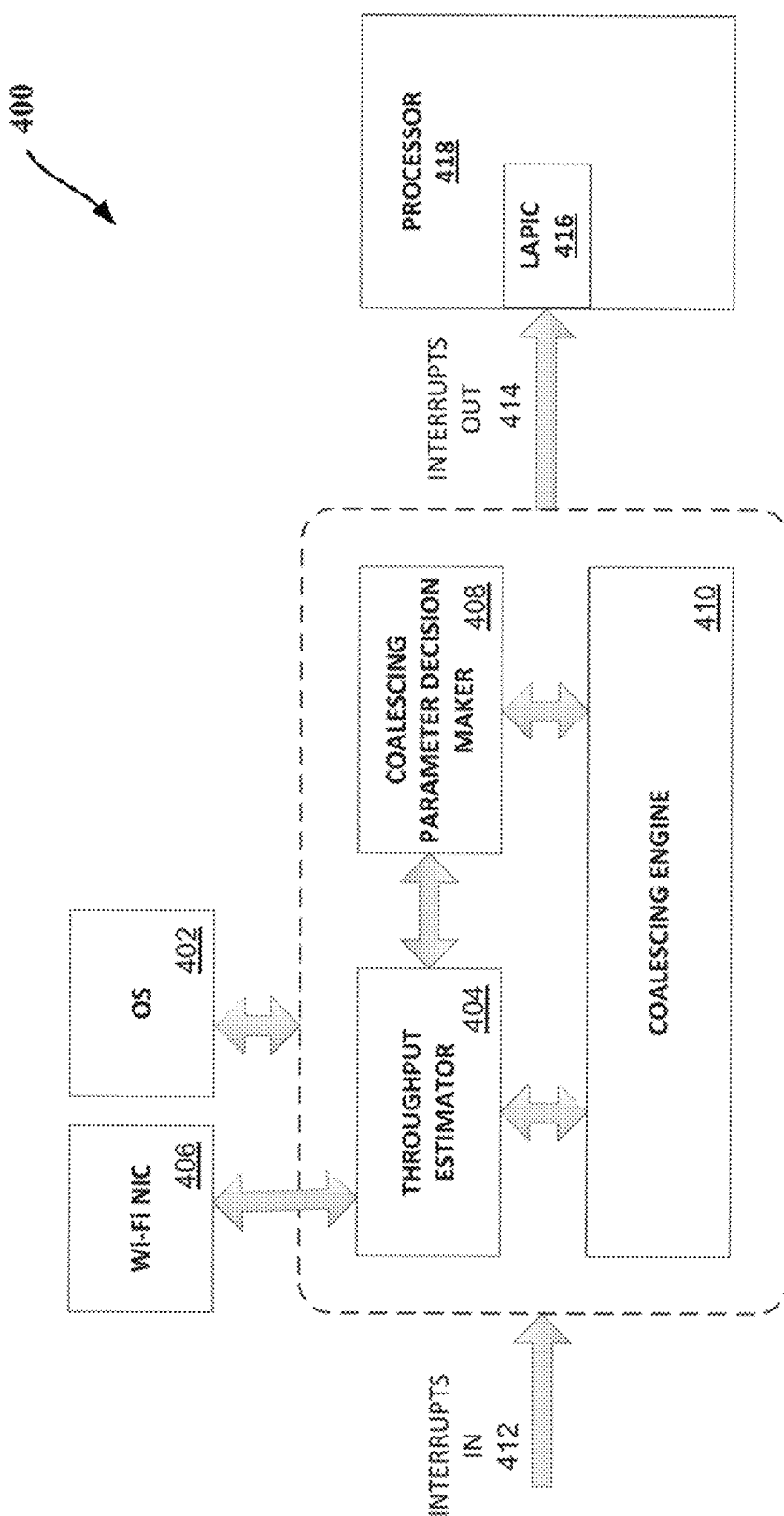
FIG. 4 illustrates a block diagram of components to provide for interrupt coalescing window size and timeout period adaptation, according to an embodiment.

FIG. 4 illustrates a block diagram of components 400 to provide for interrupt coalescing window size (also referred to herein as an interrupt coalescing time period) and timeout period adaptation, according to an embodiment.

In an embodiment, FIG. 4 illustrates some components of logic 160 (e.g., items 404, 408, and 410). The throughput information can be either obtained directly from the OS 402 (e.g., from an application, etc.), or estimated (e.g., by throughput estimator logic 404) based on other information available in the platform (such as interrupt behavior observed in firmware or traffic statistics from the Wi-Fi NIC 406, etc.), as shown in FIG. 4.

Based on the throughput information (and/or various other characteristics such as traffic load, throughput goal, power profile, remaining battery life, user preference, types of running application(s) (e.g., 3D gaming, Internet telephony, etc.)), decision maker 408 determines the optimal window size that can maximize platform power saving, while sustaining the throughput level. In some embodiments, the optimal set of coalescing parameters (e.g., timeout period and interrupt coalescing time period) for different throughput values can be obtained from off-line profiling of power and performance, which may be stored in a table for online lookup. For example, in an embodiment, a system designer can first calculate the optimal coalescing window values for different throughput ranges, and then build a lookup table for runtime adaptation. As such, the coalescing parameter decision maker 408 can quickly find the optimal parameters at run-time from the table based on the estimated throughput. Then, the coalescing engine 410 starts to buffer the incoming interrupts 412 using the optimal coalescing window, as determined by the decision maker 408.

After expiration of the interrupt coalescing time period, the coalesced interrupts 414 are sent to an LAPIC (Local Advanced Programmable Interrupt Controller) 416 of the destined processor core 418 for interrupt handling, e.g., in a burst. Accordingly, during the coalescing window, the processor/platform can enter deep sleep state (e.g., C6/S0ix), thus significantly reducing the platform consumption.

Figure 5:
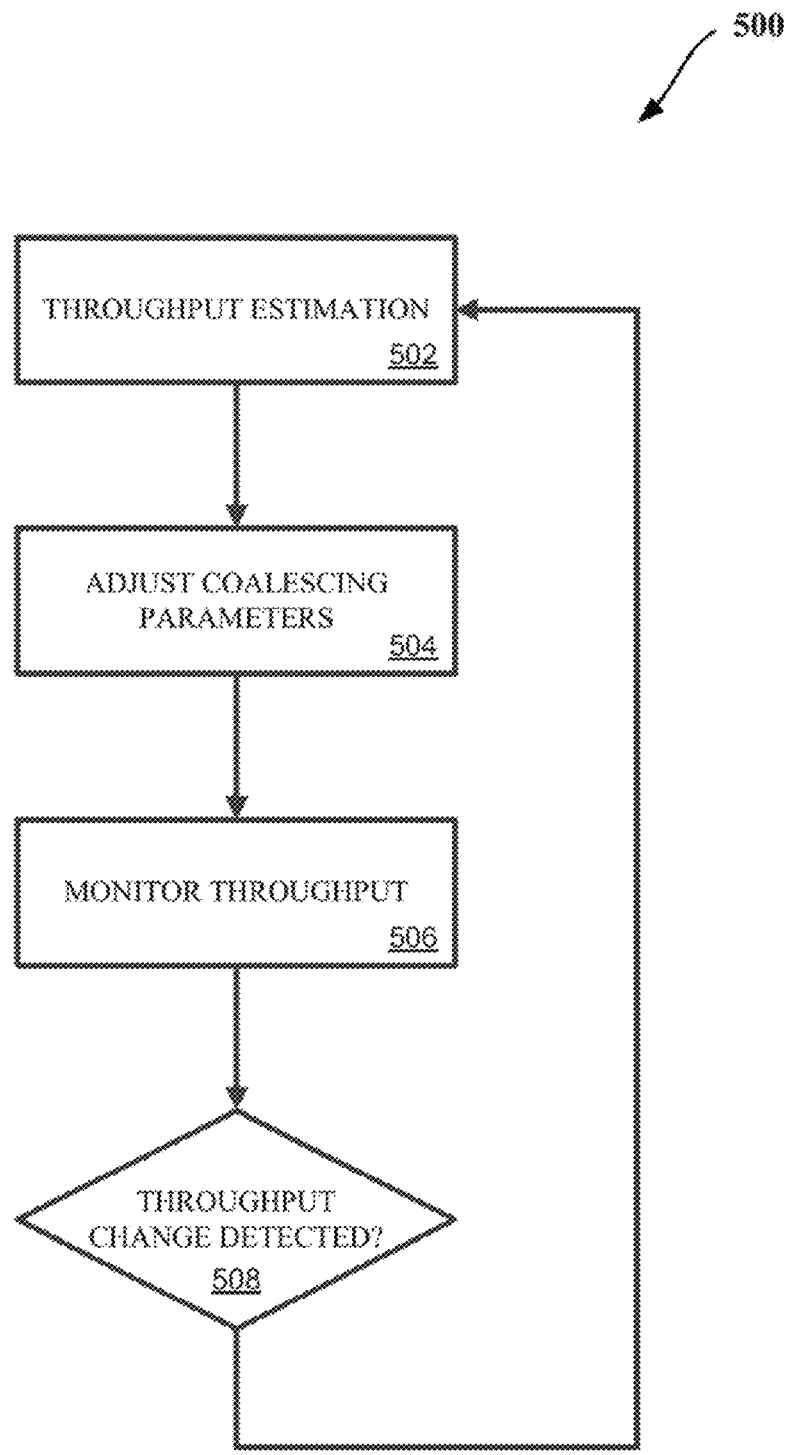
FIG. 5 illustrates a flow diagram of a method according to an embodiment.

FIG. 5 illustrates a flow diagram of a method 500 coalescing window adaptation, according to one embodiment. In an embodiment, FIG. 5 shows an exemplary method for coalescing parameter optimization. In some embodiments, various components discussed with reference to FIGS. 1-4 and 6-8 may be utilized to perform one or more of the operations discussed with reference to FIG. 5. For example, the logic 160 may be used to dynamically control interrupt coalescing for one or more devices and/or perform one or more of the operations discussed with reference to method 500.

Referring to FIGS. 1-5, once the throughput is estimated at operation 502, the decision maker (e.g., logic 408) will (e.g., based on the lookup table from offline profiler) adjust the coalescing parameters at operation 504 and start monitoring throughput performance at operation 506. Moreover, the throughput estimation can be done using the techniques that are described above (e.g., with reference to FIGS. 1-4). If the throughput changes more than pre-defined threshold at an operation 508 (e.g., 1 Mbps), then it may indicate that the coalescing parameters need to be re-adjusted. To this end, in an embodiment, throughput monitoring logic will continuously monitor the throughput to detect any meaningful throughput changes. Once the throughput change has been detected (e.g., beyond some threshold value) at operation 508, the coalescing parameters are re-adjusted and method 500 repeats this cycle.

As discussed with respect to throughput estimation, throughput may be monitored in different ways. For example, the OS can periodically provide the throughput information. Wi-Fi NIC may also provide hints (e.g., RX/TX (Receive/Transmit) queue(s) occupancy in the NIC) for throughput changes. Further, throughput may be monitored based on interrupt behavior, e.g., changes in the number of interrupts per second (which can be correlated to throughput). For example, the coalescing engine may periodically turn off the coalescing and monitor the interrupt behavior to detect any changes in throughput.

Interrupt coalescing may sustain the offered throughput in low and moderately high throughput ranges (e.g., <21 Mbps). However, the achieved (measure) throughput may start to degrade at high throughput ranges (e.g., 30 Mbps and 40 Mbps) because the offered throughput (i.e., the packer transmission rate from the sender side) may not be sustained with excessive interrupts coalescing (or packet queuing). For example, at 30 Mbps, interrupt coalescing with 8 ms coalescing window suffers throughput performance (compared to "no BEC"), whereas interrupt coalescing with 5 ms coalescing window still delivers the offered throughput. Therefore, some embodiments for adapting the coalescing window may maximize platform power savings without compromising the throughput performance. Furthermore, while some discussions herein may be focusing on communications subsystems (e.g., Wi-Fi), such specific discussions do not limit applicability of embodiments, and the various embodiments may be applied to any type of computing system(s), component(s), and device(s). Also, interrupt coalescing mechanism can be implemented in logic, e.g., either in software (e.g., OS and/or software application(s)) or in hardware/firmware depending on its feasibility and efficiency.

Figure 6:
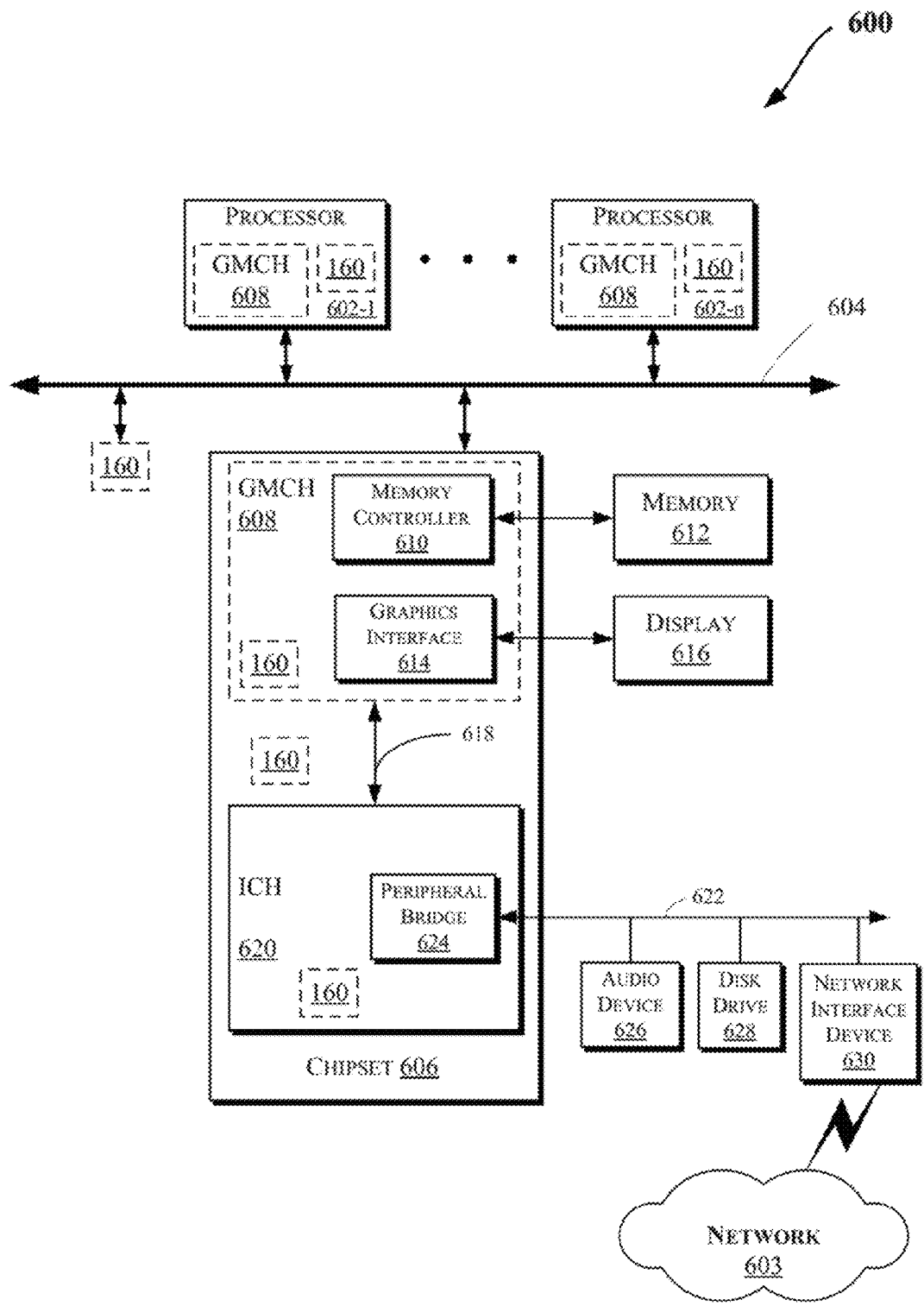

FIG. 6 illustrates a block diagram of a computing system 600 in accordance with an embodiment. The computing system 600 may include one or more central processing unit(s) (CPUs) 602 or processors that communicate via an interconnection network (or bus) 604. The processors 602 may include a general purpose processor, a network processor (that processes data communicated over a computer network 603), or other types of a processor (including a reduced instruction set computer (RISC) processor or a complex instruction set computer (CISC)).

Moreover, the processors 602 may have a single or multiple core design. The processors 602 with a multiple core design may integrate different types of processor cores on the same integrated circuit (IC) die. Also, the processors 602 with a multiple core design may be implemented as symmetrical or asymmetrical multiprocessors. In an embodiment, one or more of the processors 602 may be the same or similar to the processors 102 of FIG. 1. For example, one or more components of system 600 may include logic 160 (e.g., as shown in FIG. 6) or other components discussed with reference to FIGS. 1-5. Also, the operations discussed with reference to FIGS. 1-5 may be performed by one or more components of the system 600.

A chipset 606 may also communicate with the interconnection network 604. The chipset 606 may include a Graphics and Memory Control Hub (GMCH) 608. The GMCH 608 may include a memory controller 610 that communicates with a memory 612 (which may be the same or similar to the memory 114 of FIG. 1). The memory 612 may store data, including sequences of instructions, that may be executed by the CPU 602, or any other device included in the computing system 600). In one embodiment, the memory 612 may include one or more volatile storage (or memory) devices such as random access memory (RAM), dynamic RAM (DRAM), synchronous DRAM (SDRAM), static RAM (SRAM), or other types of storage devices.

Nonvolatile memory may also be utilized such as a hard disk. Additional devices may communicate via the interconnection network 604, such as multiple CPUs and/or multiple system memories.

The GMCH 608 may also include a graphics interface 614 that communicates with a display device 616. In one embodiment, the graphics interface 614 may communicate with the display device 616 via an accelerated graphics port (AGP). In an embodiment, the display device 616 (such as a flat panel display) may communicate with the graphics interface 614 through, for example, a signal converter that translates a digital representation of an image stored in a storage device such as video memory or system memory into display signals that are interpreted and displayed by the display device 616. The display signals produced by the display device may pass through various control devices before being interpreted by and subsequently displayed on the display device 616.

A hub interface 618 may allow the GMCH 608 and an input/output control hub (ICH) 620 to communicate. The ICH 620 may provide an interface to I/O device(s) that communicate with the computing system 600. The ICH 620 may communicate with a bus 622 through a peripheral bridge (or controller) 624, such as a peripheral component interconnect (PCI) bridge, a universal serial bus (USB) controller, or other types of peripheral bridges or controllers. The bridge 624 may provide a data path between the CPU 602 and peripheral devices. Other types of topologies may be utilized. Also, multiple buses may communicate with the ICH 620, e.g., through multiple bridges or controllers. Moreover, other peripherals in communication with the ICH 620 may include, in various embodiments, integrated drive electronics (IDE) or small computer system interface (SCSI) hard drive(s), USB port(s), a keyboard, a mouse, parallel port(s), serial port(s), floppy disk drive(s), digital output support (e.g., digital video interface (DVI)), or other devices.

The bus 622 may communicate with an audio device 626, one or more disk drive(s) 628, and a network interface device 630 (which is in communication with the computer network 603). Other devices may communicate via the bus 622. Also, various components (such as the network interface device 630) may communicate with the GMCH 608 in some embodiments. In addition, the processor 602 and the GMCH 608 may be combined to form a single chip and/or a portion or the whole of the GMCH 608 may be included in the processors 602 (instead of inclusion of GMCH 608 in the chipset 606, for example). Furthermore, a graphics accelerator (not shown) may be included within the GMCH 608 in other embodiments.

Furthermore, the computing system 600 may include volatile and/or nonvolatile memory (or storage). For example, nonvolatile memory may include one or more of the following: read-only memory (ROM), programmable ROM (PROM), erasable PROM (EPROM), electrically EPROM (EEPROM), a disk drive (e.g., 628), a floppy disk, a compact disk ROM (CD-ROM), a digital versatile disk (DVD), flash memory, a magneto-optical disk, or other types of nonvolatile machine-readable media that are capable of storing electronic data (e.g., including instructions).

Figure 7:
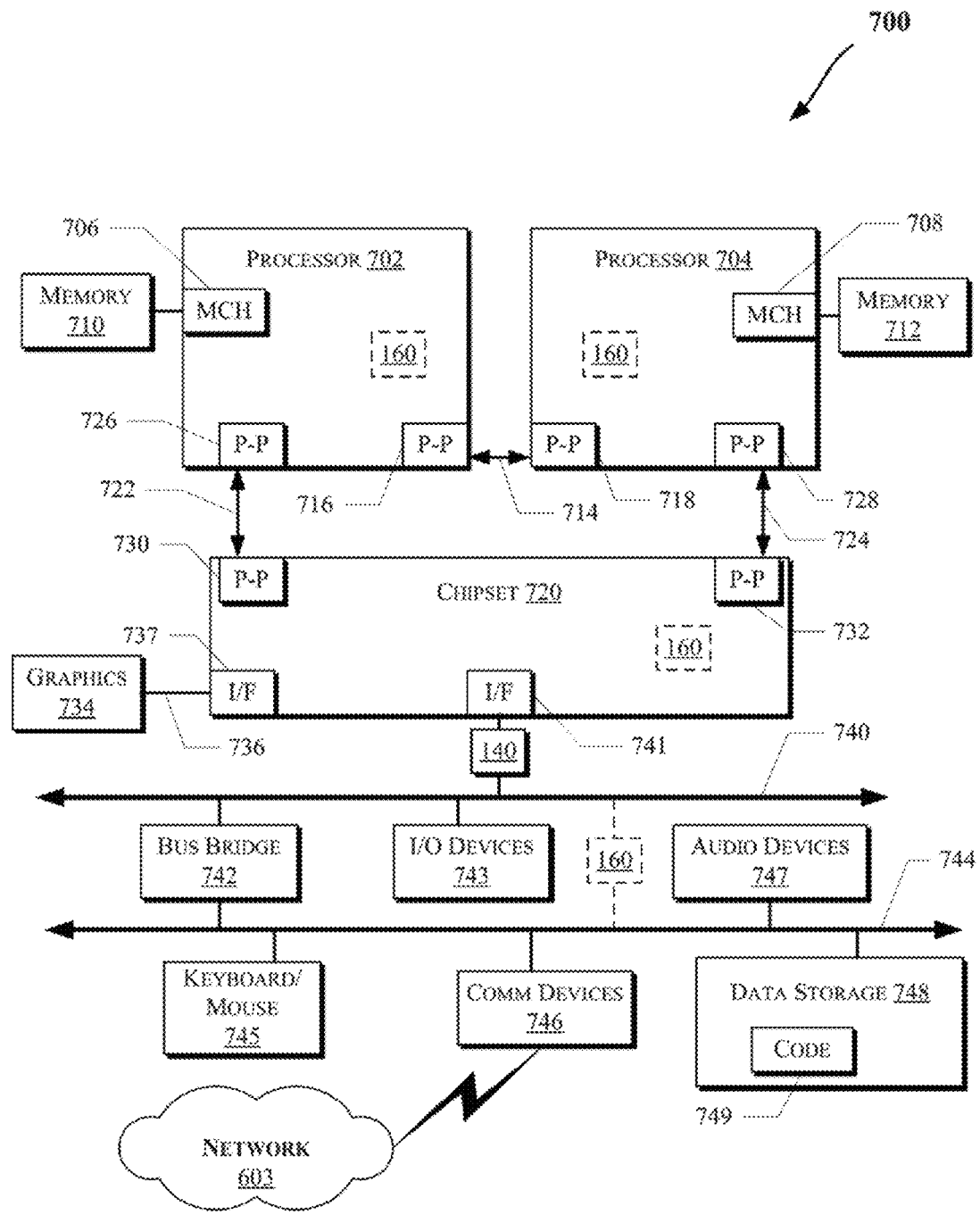

FIG. 7 illustrates a computing system 700 that is arranged in a point-to-point (PtP) configuration, according to an embodiment. In particular. FIG. 7 shows a system where processors, memory, and input/output devices are interconnected by a number of point-to-point interfaces. The operations discussed with reference to FIGS. 1-6 may be performed by one or more components of the system 700.

As illustrated in FIG. 7, the system 700 may include several processors, of which only two, processors 702 and 704 are shown for clarity. The processors 702 and 704 may each include a local memory controller hub (MCH) 706 and 708 to enable communication with memories 710 and 712. The memories 710 and/or 712 may store various data such as those discussed with reference to the memory 612 of FIG. 6.

In an embodiment, the processors 702 and 704 may be one of the processors 602 discussed with reference to FIG. 6. The processors 702 and 704 may exchange data via a point-to-point (PtP) interface 714 using PtP interface circuits 716 and 718, respectively. Also, the processors 702 and 704 may each exchange data with a chipset 720 via individual PtP interfaces 722 and 724 using point-to-point interface circuits 726, 728, 730, and 732. The chipset 720 may further exchange data with a graphics circuit 734 via a graphics interface 736, e.g., using a PtP interface circuit 737.

At least one embodiment may be provided within the processors 702 and 704. For example, one or more components of system 700 may include logic 160 of FIGS. 1-6, including located within the processors 702 and 704. Other embodiments, however, may exist in other circuits, logic units, or devices within the system 700 of FIG. 7. Furthermore, other embodiments may be distributed throughout several circuits, logic units, or devices illustrated in FIG. 7.

The chipset 720 may communicate with a bus 740 using a PtP interface circuit 741. The bus 740 may communicate with one or more devices, such as a bus bridge 742 and I/O devices 743. Via a bus 744, the bus bridge 742 may communicate with other devices such as a keyboard/mouse 745, communication devices 746 (such as modems, network interface devices, or other communication devices that may communicate with the computer network 603), audio I/O device 747, and/or a data storage device 748. The data storage device 748 may store code 749 that may be executed by the processors 702 and/or 704.

Figure 8:
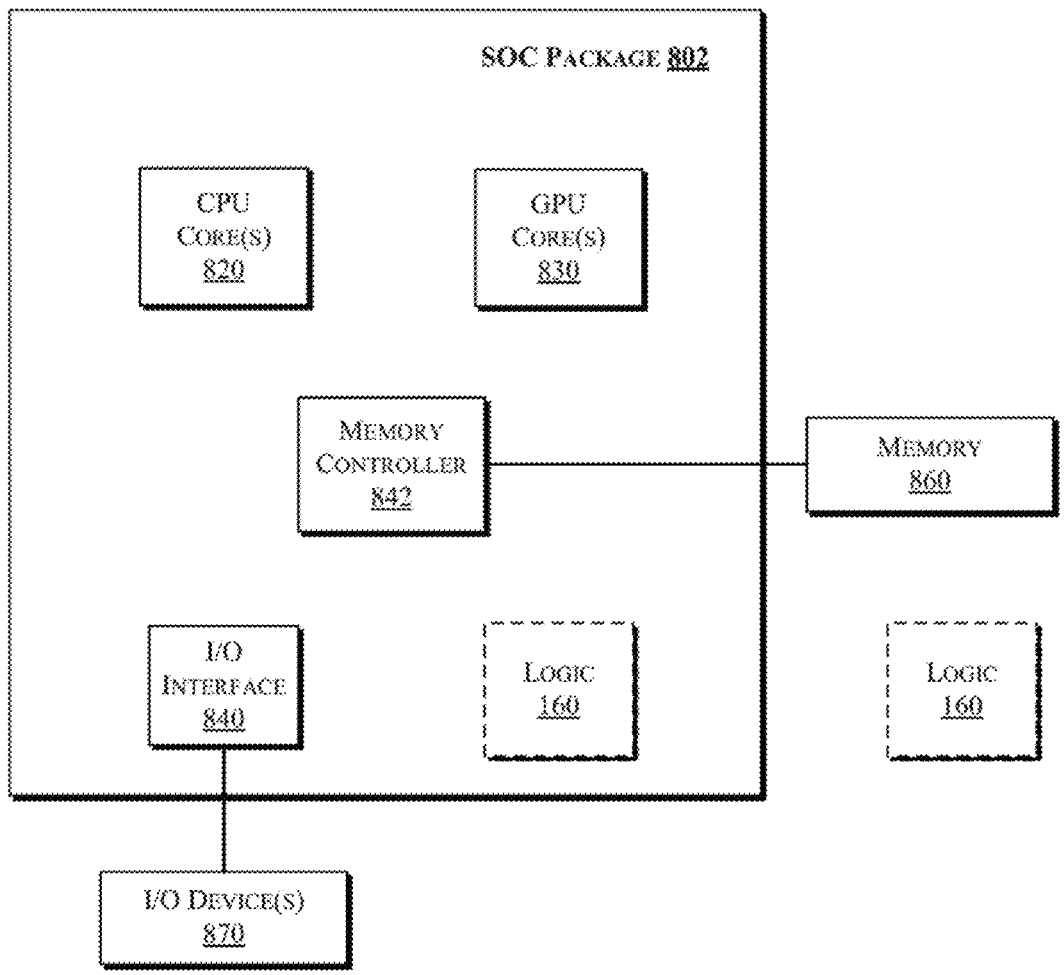

In some embodiments, one or more of the components discussed herein can be embodied as a System On Chip (SOC) device. FIG. 8 illustrates a block diagram of an SOC package in accordance with an embodiment. As illustrated in FIG. 8, SOC 802 includes one or more Central Processing Unit (CPU) cores 820, one or more Graphics Processor Unit (GPU) cores 830, an Input/Output (I/O) interface 840, and a memory controller 842. Various components of the SOC package 802 may be coupled to an interconnect or bus such as discussed herein with reference to the other figures. Also, the SOC package 802 may include more or less components, such as those discussed herein with reference to the other figures. Further, each component of the SOC package 820 may include one or more other components, e.g., as discussed with reference to the other figures herein. In one embodiment, SOC package 802 (and its components) is provided on one or more Integrated Circuit (IC) die, e.g., which are packaged into a single semiconductor device.

As illustrated in FIG. 8, SOC package 802 is coupled to a memory 860 (which may be similar to or the same as memory discussed herein with reference to the other figures) via the memory controller 842. In an embodiment, the memory 860 (or a portion of it) can be integrated on the SOC package 802.

The I/O interface 840 may be coupled to one or more I/O devices 870, e.g., via an interconnect and/or bus such as discussed herein with reference to other figures. I/O device(s) 870 may include one or more of a keyboard, a mouse, a touchpad, a display, an image/video capture device (such as a camera or camcorder/video recorder), a touch screen, a speaker, or the like. Furthermore, SOC package 802 may include/integrate the logic 160 in an embodiment. Alternatively, the logic 160 may be provided outside of the SOC package 802 (i.e., as a discrete logic).

The following examples pertain to further embodiments. Example 1 includes an apparatus comprising: logic at least partially implemented in hardware, the logic to cause buffering of one or more interrupts based at least in part on communication throughput, wherein the logic is to cause release of at least one of the one or more buffered interrupts in response to expiration of an interrupt coalescing time period. Example 2 includes the apparatus of example 1, wherein the logic is to cause buffering of the one or more interrupts based at least in part on one or more parameters, wherein the one or more parameters are to comprise one or more of: a timeout period and the interrupt coalescing time period. Example 3 includes the apparatus of example 2, wherein the logic is to cause buffering of the one or more interrupts after expiration of the timeout period following detection of an interrupt that precedes the one or more interrupts. Example 4 includes the apparatus of example 2, wherein the logic is to cause buffering of the one or more interrupts for duration of the interrupt coalescing time period and after expiration of the timeout period. Example 5 includes the apparatus of example 2, comprising logic to adjust the one or more parameters based on system dynamics information. Example 6 includes the apparatus of example 5, wherein the system dynamics information is to comprise one or more of: traffic load, throughput goal, power profile, remaining battery life, user preference, and type of a running application. Example 7 includes the apparatus of example 1, comprising logic to provide the communication throughput based on information from an operating system. Example 8 includes the apparatus of example 1, comprising logic to estimate the communication throughput based on information available in a platform that comprises the apparatus. Example 9 includes the apparatus of example 8, wherein the information is to comprise one or more of: interrupt behavior information observed in firmware and traffic statistics from a network device. Example 10 includes the apparatus of example 1, comprising logic to estimate the communication throughput based on information from a wireless network device. Example 11 includes the apparatus of example 1, further comprising memory to store a table that contains a plurality interrupt coalescing time values for a plurality of throughput values. Example 12 includes the apparatus of example 1, wherein the logic is to adjust a frequency of buffering of the one or more interrupts based on throughput monitoring information. Example 13 includes the apparatus of example 1, wherein the logic is to adjust a duration of buffering of the one or more interrupts based on throughput monitoring information. Example 14 includes the apparatus of example 1, wherein the logic is to release at least one of the one or more buffered interrupts as a burst in response to expiration of the interrupt coalescing time period. Example 15 includes the apparatus of example 1, wherein the logic is to cause buffering of the one or more interrupts destined to a processor core. Example 16 includes the apparatus of example 1, wherein the logic, one or more processor cores, and memory are located on a single integrated circuit die.

Example 17 includes a method comprising: causing buffering of one or more interrupts based at least partially on communication throughput; and releasing at least one of the one or more buffered interrupts in response to expiration of an interrupt coalescing time period. Example 18 includes the method of example 17, wherein causing buffering of the one or more interrupts is performed based at least partially on one or more parameters, the method further comprising adjusting the one or more parameters based on system dynamics information. Example 19 includes the method of example 17, further comprising providing the communication throughput based on information from one or more of: an operating system, interrupt behavior information observed in firmware, and traffic statistics from a network device. Example 20 includes the method of example 17, further comprising determining the communication throughput based on information from a wireless network device. Example 21 includes the method of example 17, further comprising storing a table in memory, wherein the table contains a plurality interrupt coalescing time values for a plurality of throughput values.

Example 22 includes a computer-readable medium comprising one or more instructions that when executed on a processor configure the processor to perform one or more operations of any of examples 17 to 21.

Example 23 includes a system comprising: a wireless network device and a battery; a processor comprising logic, the logic at least partially implemented in hardware, wherein the logic is to cause buffering of one or more interrupts based at least in part on communication throughput, wherein the logic is to cause release of at least one of the one or more buffered interrupts in response to expiration of an interrupt coalescing time period. Example 24 includes the system of example 23, wherein the logic is to cause buffering of the one or more interrupts based at least in part on one or more parameters, wherein the one or more parameters are to comprise one or more of: a timeout period and the interrupt coalescing time period. Example 25 includes the system of example 24, wherein the logic is to cause buffering of the one or more interrupts for duration of the interrupt coalescing time period and after expiration of the timeout period. Example 26 includes the system of example 23, comprising logic to determine the communication throughput based on information from a wireless network device.

Example 27 includes an apparatus to provide adaptive interrupt coalescing for energy efficient mobile platforms, where the apparatus comprises: means for causing buffering of one or more interrupts based at least partially on communication throughput: and means for releasing at least one of the one or more buffered interrupts in response to expiration of an interrupt coalescing time period. Example 28 includes the apparatus of example 27, wherein the means for causing buffering of the one or more interrupts is to operate based at least partially on one or more parameters, the method further comprising adjusting the one or more parameters based on system dynamics information. Example 29 includes the apparatus of example 27, further comprising means for providing the communication throughput based on information from one or more of: an operating system, interrupt behavior information observed in firmware, and traffic statistics from a network device. Example 30 includes the apparatus of example 27, further comprising means for determining the communication throughput based on information from a wireless network device. Example The apparatus of example 27, further comprising means for storing a table in memory, wherein the table contains a plurality interrupt coalescing time values for a plurality of throughput values.

In various embodiments, the operations discussed herein, e.g., with reference to FIGS. 1-8, may be implemented as hardware (e.g., logic circuitry), software, firmware, or combinations thereof, which may be provided as a computer program product, e.g., including (e.g., a non-transitory)

machine-readable or computer-readable medium having stored thereon instructions (or software procedures) used to program a computer to perform a process discussed herein. The machine-readable medium may include a storage device such as those discussed with respect to FIGS. 1-8.

Additionally, such computer-readable media may be downloaded as a computer program product, wherein the program may be transferred from a remote computer (e.g., a server) to a requesting computer (e.g., a client) by way of data signals embodied in a carrier wave or other propagation medium via a communication link (e.g., a bus, a modem, or a network connection).

Reference in the specification to "one embodiment," "an embodiment," or "some embodiments" means that a particular feature, structure, or characteristic described in connection with the embodiment(s) may be included in at least an implementation. The appearances of the phrase "in one embodiment" in various places in the specification may or may not be all referring to the same embodiment.

Also, in the description and claims, the terms "coupled" and "connected," along with their derivatives, may be used. In some embodiments, "connected" may be used to indicate that two or more elements are in direct physical or electrical contact with each other. "Coupled" may mean that two or more elements are in direct physical or electrical contact. However, "coupled" may also mean that two or more elements may not be in direct contact with each other, but may still cooperate or interact with each other.

Thus, although embodiments have been described in language specific to structural features and/or methodological acts, it is to be understood that claimed subject matter may not be limited to the specific features or acts described. Rather, the specific features and acts are disclosed as sample forms of implementing the claimed subject matter.

The invention claimed is:

1. An apparatus comprising:
   logic at least partially implemented in hardware, the logic to cause buffering of one or more interrupts based at least in part on communication throughput,
   wherein the logic is to cause release of at least one of the one or more buffered interrupts in response to expiration of an interrupt coalescing time period, wherein the logic is to cause buffering of the one or more interrupts based at least in part on one or more parameters, wherein the one or more parameters are to be adjusted based on remaining battery life, wherein the logic is to adjust a frequency of buffering of the one or more interrupts based on throughput monitoring information, wherein the logic is to adjust a duration of buffering of the one or more interrupts based on throughput monitoring information.

2. The apparatus of claim 1, wherein the one or more parameters are to comprise one or more of: a timeout period and the interrupt coalescing time period.

3. The apparatus of claim 2, wherein the logic is to cause buffering of the one or more interrupts after expiration of the timeout period following detection of an interrupt that precedes the one or more interrupts.

4. The apparatus of claim 2, wherein the logic is to cause buffering of the one or more interrupts for duration of the interrupt coalescing time period and after expiration of the timeout period.

5. The apparatus of claim 2, comprising logic to adjust the one or more parameters based on system dynamics information.

6. The apparatus of claim 5, wherein the system dynamics information is to comprise one or more of: traffic load, throughput goal, power profile, user preference, and type of a running application.

7. The apparatus of claim 1, comprising logic to provide the communication throughput based on information from an operating system.

8. The apparatus of claim 1, comprising logic to estimate the communication throughput based on information available in a platform that comprises the apparatus.

9. The apparatus of claim 8, wherein the information is to comprise one or more of: interrupt behavior information observed in firmware and traffic statistics from a network device.

10. The apparatus of claim 1, comprising logic to estimate the communication throughput based on information from a wireless network device.

11. The apparatus of claim 1, further comprising memory to store a table that contains a plurality interrupt coalescing time values for a plurality of throughput values.

12. The apparatus of claim 1, wherein the logic is to release at least one of the one or more buffered interrupts as a burst in response to expiration of the interrupt coalescing time period.

13. The apparatus of claim 1, wherein the logic is to cause buffering of the one or more interrupts destined to a processor core.

14. The apparatus of claim 1, wherein the logic, one or more processor cores, and memory are located on a single integrated circuit die.

15. The apparatus of claim 1, wherein the logic is to adjust the frequency of buffering of the one or more interrupts based on the throughput monitoring information and length of coalescing duration for each buffering instance.

16. A method comprising:
   causing buffering of one or more interrupts based at least partially on communication throughput; and
   releasing at least one of the one or more buffered interrupts in response to expiration of an interrupt coalescing time period, wherein buffering of the one or more interrupts is performed based at least in part on one or more parameters, wherein the one or more parameters are adjusted based on remaining battery life, wherein a frequency of buffering of the one or more interrupts is adjusted based on throughput monitoring information, wherein a duration of buffering of the one or more interrupts is adjusted based on throughput monitoring information.

17. The method of claim 16, further comprising adjusting the one or more parameters based on system dynamics information.

18. The method of claim 16, further comprising providing the communication throughput based on information from one or more of: an operating system, interrupt behavior information observed in firmware, and traffic statistics from a network device.

19. The method of claim 16, further comprising determining the communication throughput based on information from a wireless network device.

20. The method of claim 16, further comprising storing a table in memory, wherein the table contains a plurality interrupt coalescing time values for a plurality of throughput values.

21. The method of claim 16, wherein the frequency of buffering of the one or more interrupts is adjusted based on the throughput monitoring information and length of coalescing duration for each buffering instance.

22. A system comprising:
a wireless network device and a battery;
a processor comprising logic, the logic at least partially implemented in hardware, wherein the logic is to cause buffering of one or more interrupts based at least in part on communication throughput,
wherein the logic is to cause release of at least one of the one or more buffered interrupts in response to expiration of an interrupt coalescing time period, wherein the logic is to cause buffering of the one or more interrupts based at least in part on one or more parameters, wherein the one or more parameters are to be adjusted based on remaining life of the battery, wherein the logic is to adjust a frequency of buffering of the one or more interrupts based on throughput monitoring information, wherein the logic is to adjust a duration of buffering of the one or more interrupts based on throughput monitoring information.

23. The system of claim 22, wherein the one or more parameters are to comprise one or more of: a timeout period and the interrupt coalescing time period.

24. The system of claim 23, wherein the logic is to cause buffering of the one or more interrupts for duration of the interrupt coalescing time period and after expiration of the timeout period.

25. The system of claim 22, wherein the logic is to adjust the frequency of buffering of the one or more interrupts based on the throughput monitoring information and length of coalescing duration for each buffering instance.

* * * * *